United States Patent
Attwood et al.

(10) Patent No.: US 6,347,376 B1
(45) Date of Patent: Feb. 12, 2002

(54) SECURITY RULE DATABASE SEARCHING IN A NETWORK SECURITY ENVIRONMENT

(75) Inventors: Kira Sterling Attwood, Chapel Hill; James Russell Godwin; Linwood Hugh Overby, Jr., both of Raleigh, all of NC (US); Brian Sean Perry, Johnson City; David John Wierbowski, Owego, both of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/373,104

(22) Filed: Aug. 12, 1999

(51) Int. Cl.[7] .............................. G06F 11/30; H04L 9/00
(52) U.S. Cl. ........................................... 713/201; 707/3
(58) Field of Search ................................. 713/200, 168; 709/221, 223, 225; 707/3, 9, 104

(56) References Cited

U.S. PATENT DOCUMENTS

| | | | | |
|---|---|---|---|---|
| 5,898,830 A | * | 4/1999 | Wesinger, Jr. et al. | 395/187.01 |
| 5,983,350 A | * | 11/1999 | Minear et al. | 713/201 |
| 6,105,027 A | * | 8/2000 | Schneider et al. | 707/9 |
| 6,154,775 A | * | 11/2000 | Coss et al. | 709/225 |

* cited by examiner

Primary Examiner—John Breene
Assistant Examiner—Susan Rayyan
(74) Attorney, Agent, or Firm—Jerry W. Herndon

(57) ABSTRACT

Ipsec rules are searched in order from rules containing the most specificity of attributes to those containing the least specificity of attributes. The static rules include placeholders for sets of dynamic rules. The placeholders in the static table immediately precede and point to an associated set of dynamic rules. Dynamic rules are searched only if a placeholder is found to be the first matching rule in the static table. Sets of dynamic rules are partitioned into separate groups. Within each group there is no rule order dependence. Each such group is searched with an enhanced search mechanism, such as a search tree. Searching is further improved by searching at layers higher than the IP layer.

16 Claims, 11 Drawing Sheets

FIG. 1
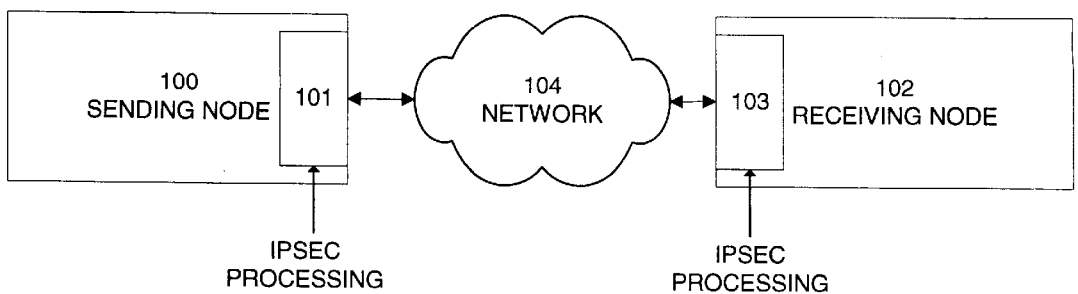
FIG.2 - PRIOR ART
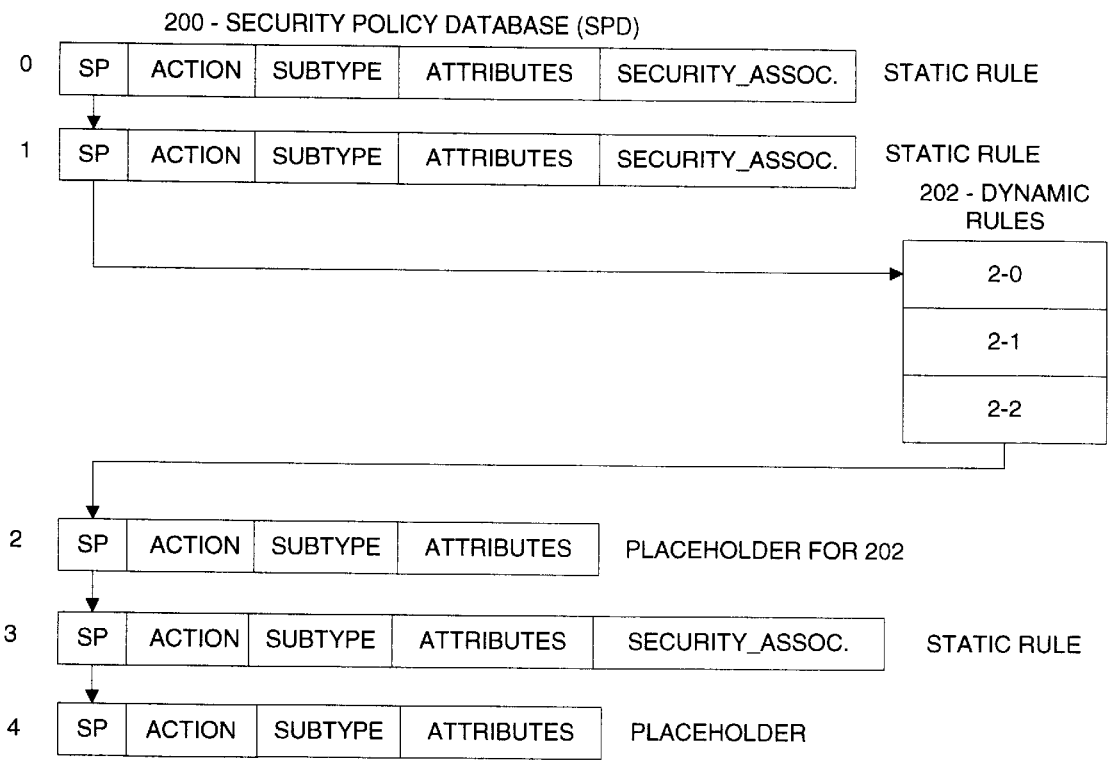

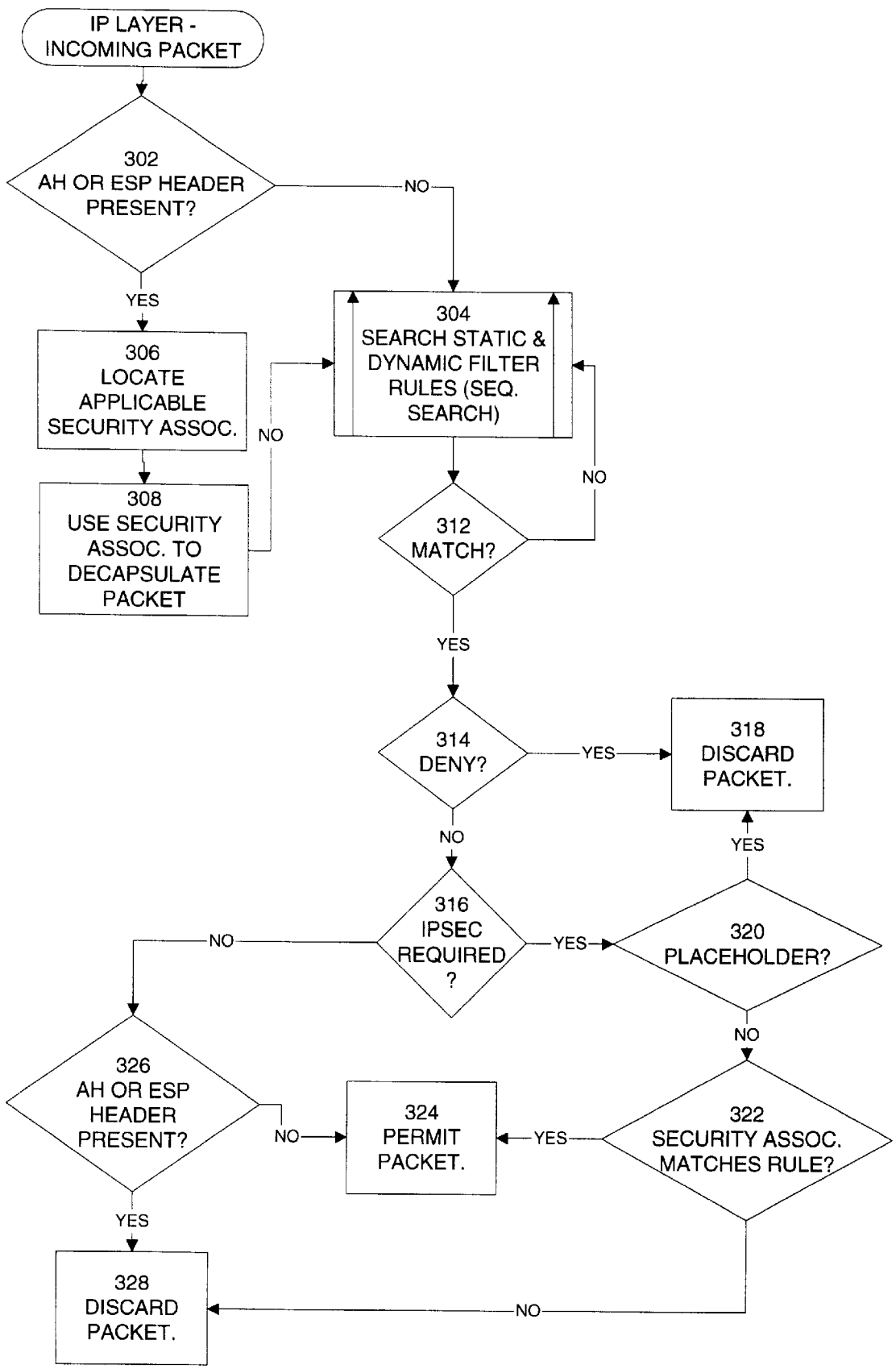

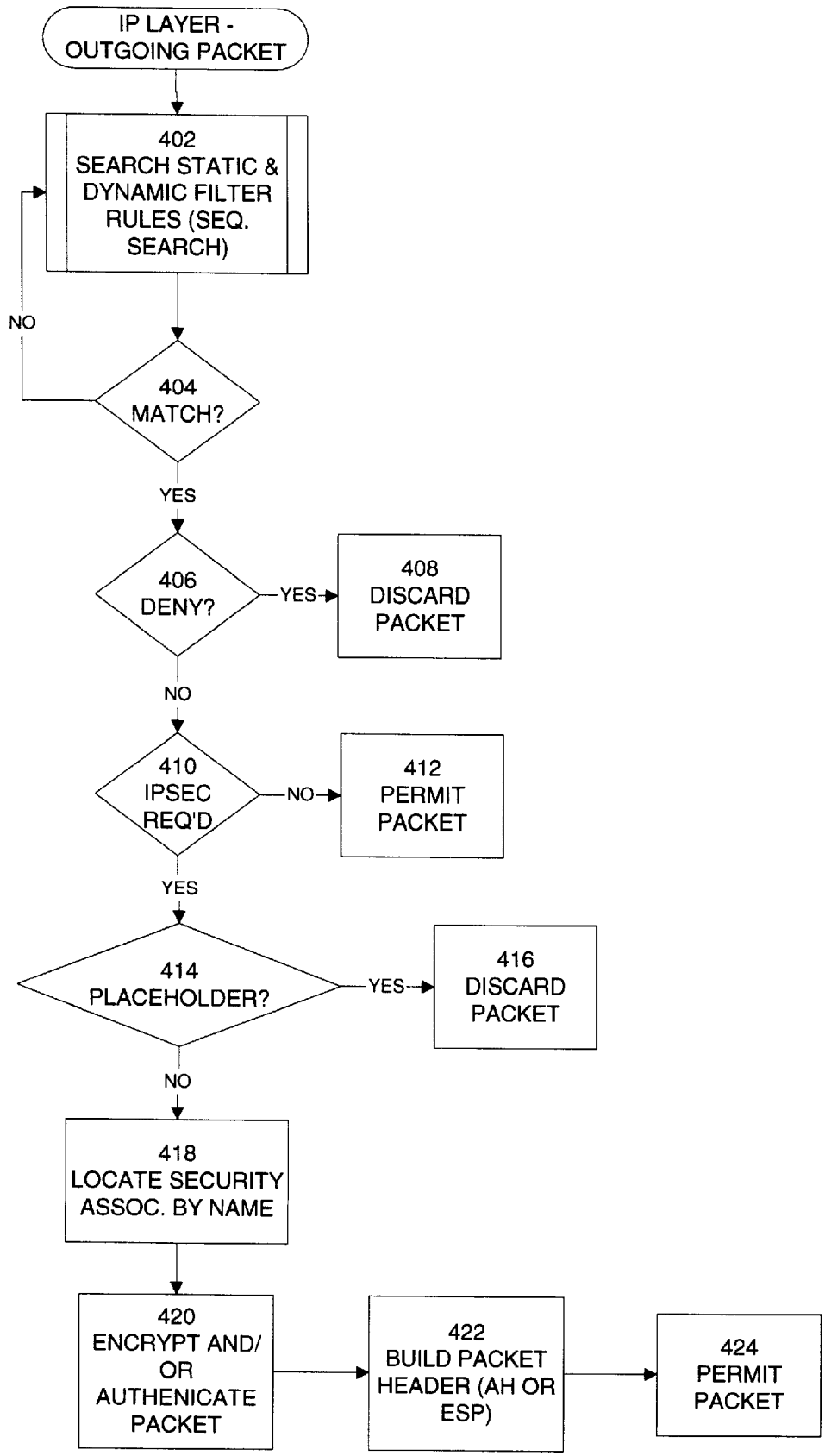
FIG. 4 - PRIOR ART

FIG. 5

500 - STATIC RULES

| | SP | ACTION | SUBTYPE | SECURITY_ASSOC | ATTRIBUTES | |
|---|----|--------|---------|----------------|------------|---|
| 0 | SP | ACTION | SUBTYPE | SECURITY_ASSOC | ATTRIBUTES | RULE |
| 1 | SP | ACTION | SUBTYPE | SECURITY_ASSOC | ATTRIBUTES | RULE |
| 2 | SP | ACTION = PERMIT | SUBTYPE = DYN | S Q R P O | ATTRIBUTES | PLACE-HOLDER |

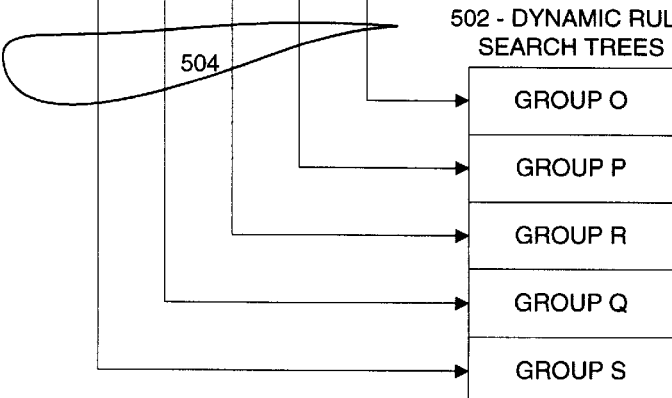

502 - DYNAMIC RULE SEARCH TREES

504

GROUP O
GROUP P
GROUP R
GROUP Q
GROUP S

FIG. 6

600 - DYNAMIC RULE SEARCH TREES

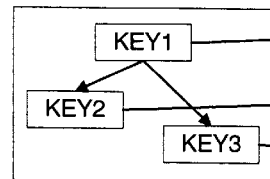

GROUP S
  KEY1
  KEY2
  KEY3

GROUP Q
  KEY4
  KEY5

GROUP R
  KEY6

GROUP P

GROUP O

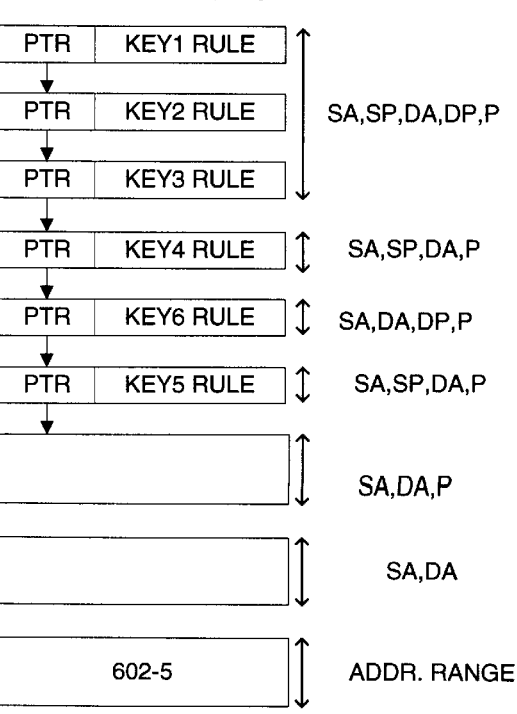

602 - DYNAMIC RULES

| PTR | KEY1 RULE |
| PTR | KEY2 RULE |  SA,SP,DA,DP,P
| PTR | KEY3 RULE |
| PTR | KEY4 RULE |  SA,SP,DA,P
| PTR | KEY6 RULE |  SA,DA,DP,P
| PTR | KEY5 RULE |  SA,SP,DA,P

SA,DA,P

SA,DA 602-5    ADDR. RANGED

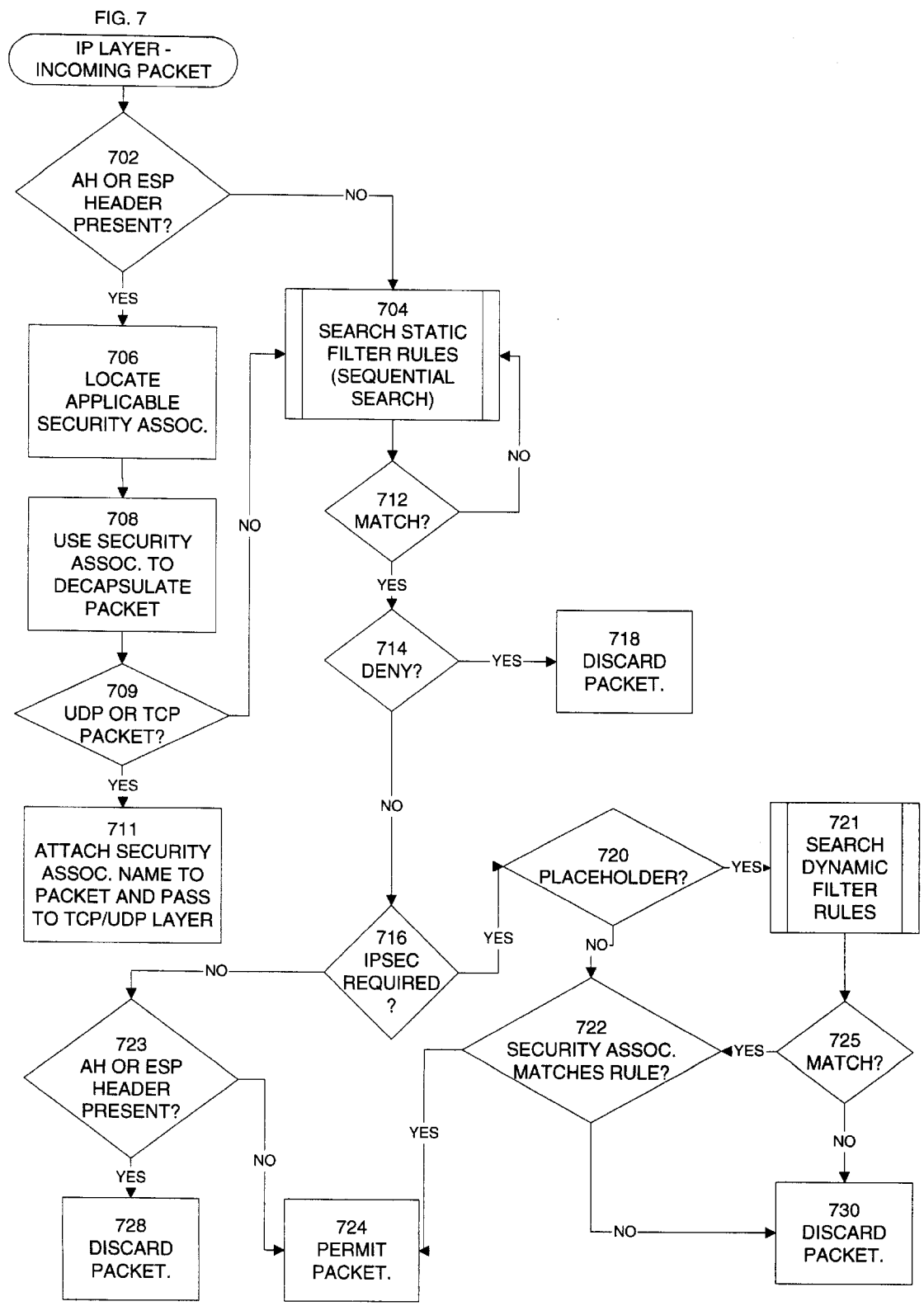

SECURITY RULE DATABASE SEARCHING IN A NETWORK SECURITY ENVIRONMENT

TECHNICAL FIELD

The invention relates generally to the field of networking and network security, and specifically to improvements in the implementation of security arrangements that conform to the requirements of RFC 2401—"Security Architecture for the Internet Protocol".

Specifically, the invention uses a data structure and arrangement that avoids the searching of dynamic security rules except when a static rule placeholder pointing to a set of dynamic rules is found to govern the security processing of a packet.

BACKGROUND OF THE INVENTION

RFC 2401 sets forth an architecture for the implementation of security in networks that use the IP protocol. This security architecture is commonly referred as IPsec. IPsec is the architecture endorsed by the Internet Engineering Task Force (IETF) for applying encryption and authentication security services to datagrams, or packets, at the IP layer of the protocol stack. The IPsec specification requires a Security Policy Database (SPD) that is used to determine how each incoming and outgoing packet is to be handled from a security perspective. The basic choices are deny packet, permit packet, and permit packet with Ipsec processing. If Ipsec processing is to be applied to a packet, the database specifies the precise processing that is to be applied. Because IPsec is applied at the IP layer, it is used for all upper layer protocols (TCP, UDP, ICMP, etc.) and it is applied as a connectionless protocol. That is, each IP packet is processed independently of any other packet.

In the known art, the SPD contains static rules and placeholders for dynamic rules. The rules and placeholders contain attributes to be matched against the corresponding attributes of incoming and outgoing packets to determine which rule should be applied to a packet. The attributes contained in the rules and placeholders might be different combinations of IP source address, source port, IP destination address, destination port and the protocol to be used. The attributes contained within a specific rule or placeholder can be as granular as specific hosts, ports and protocol for a match to occur, or as coarse as wild carded host pairs.

A static rule is essentially a policy rule. It is predefined for a network and generally not changed very often. For example, static rules might specify that all traffic between hosts A and B will be permitted without Ipsec processing and that all traffic between hosts A and C will be encrypted by IPsec. A dynamic rule is negotiated as needed and linked into the SPD database. The how, when and why of a dynamic rule negotiation is not part of the present invention and is not discussed in any detail. It suffices to say that when a dynamic rule is negotiated, the placeholder that contains the most specific attributes that includes the negotiated attributes is used to link the negotiated rule into the SPD database at the appropriate point. In the known art, the static rules, dynamic rules and placeholders are searched for every incoming and outgoing packet at a node to determine how to process the packet.

The IPsec architecture also requires that the rules be defined and processed in a specific order. This is absolutely necessary, because it is important for different hosts to apply the same type of security processing to the same packet. If a packet is encrypted with a specific algorithm, it is important that the receiving node locate the correct rule to decrypt the packet with the corresponding decryption algorithm. RFC 2401 requires that the SPD be ordered and that the SPD always be searched in the same order to insure consistent results at different nodes. The traditional technique of ordering the rules and placeholders in the SPD is from the most specific to least specific in terms of the specification of the attributes in the rules that are used for matching; the database (including static, dynamic rules and placeholders) is searched linearly in this order for every incoming and outgoing packet until a first match is found between the attributes of a packet and the attributes stored in a rule. At that point, the matching rule specifies whether the packet is denied, permitted without Ipsec processing or permitted with Ipsec processing. If the packet is permitted with Ipsec processing, the database specifies the details of that processing. This could be authentication or encryption or both.

In systems that become aggregation points (firewalls and servers) the number of filter rules in the database can be hundreds to thousands, depending on the network. In the known art, the SPD database is searched sequentially until a matching rule is found for all incoming and outgoing packets. This sequential search includes static rules and dynamic rules as they are encountered in the database. The performance cost on systems as a result of this searching is significant. In a system that has a mixture of IPsec and non-IPsec traffic, even the non-IPsec traffic is penalized because the filter rules must be searched to determine if a particular packet is subject to Ipsec processing or not.

SUMMARY OF THE INVENTION

The invention improves the performance of system IPsec rule searching in a number of ways. It is important that the Ipsec rules be searched in a predictable manner so that Ipsec processing applied at a sending end can be reversed at a receiving end. To achieve this predictability, Ipsec rules are searched in order from rules containing the most specificity of attributes to those containing the least specificity of attributes. In accordance with one aspect of the invention, the table of security rules is arranged in a way that significantly reduces the search time in most cases. The static rules include placeholders for sets of dynamic rules that are negotiated and entered into the dynamic sets as needed. The placeholders in the static table immediately precede and point to an associated set of dynamic rules. A set of dynamic rules is searched only if a match is found on the corresponding static placeholder during a search of the static rules. This dramatically improves performance, since most of the dynamic rules are not searched on a per packet basis, in contrast to the known prior art.

According to a second aspect of the invention, sets of dynamic rules are partitioned into separate groups such that within a group there is no rule order dependence. That is, within a group, the order of appearance of the rules is irrelevant. Because the rules for a group are order independent, each group can be represented by an enhanced search mechanism, rather than just a sequentially linked list of rules. Such mechanisms might be binary search trees, promoted lists and hash tables. A binary search tree, specifically a patricia tree, is used to represent each group in the preferred embodiment. There are five such groups in the preferred embodiment. The groups are searched in the order of groups containing the most specific attributes to those containing the least specific attributes. The attributes are source IP address (SA), destination IP address (DA), source port (SP), destination port (DP) and a protocol P. Each dynamic rule contained in the first group of dynamic rules specifies values for all five attributes (SA, DA, SP, DP, P).

The second and third groups specify the IP addresses SA and DA and the protocol P. In addition, the second group specifies the source port SP; the third group specifies the destination port DP. The second and third groups are special in that which appears first in sequence is not important.

The rules of the fourth group specify source address SA, destination address DA and the protocol attribute P. The rules of the fifth group specify only source address SA and destination address DA.

There is a sixth group which is order dependent and cannot be optimized for enhanced searching. The rules of the sixth group contain a range of addresses in either or both of the source and destination address fields. This fact makes the order of appearance of rules within the group important. The sixth group is searched by sequentially searching the rules themselves.

The searching of the security database is further improved by searching the database at layers higher than the IP layer as called for by RFC 2401 and as practiced by the known prior art. This allows the saving of security information associated with a matching rule to be saved in memory blocks associated with a connection, or in pseudo-connection memory blocks for packets not associated with a connection and using the stored information to avoid repeated searching of the database on every packet. In the preferred embodiment, this is done for the connection oriented TCP protocol and for the connectionless UDP protocol. In the disclosure herein, we shall refer to TCP and UDP protocols in reference to this feature of the invention. However, it should be understood that this is only the preferred embodiment and that this feature may be applied to other protocols as well.

Therefore, according to a third aspect of the invention, for connection oriented protocols such as TCP, binding information such as the Ipsec processing information from a matching rule or the address of a matching rule is stored in memory blocks associated with the connection. This allows the searching of the Ipsec rules to be performed generally only when a connection is first established. The matching rule or information from the matching rule is stored in the connection memory block and applied to each succeeding packet on the connection at the higher layer, without repeating a search of the security rules at the IP layer for every packet. If a static or dynamic rule is changed during the existence of a connection, a search of the rules must be repeated on the first packet after the rule change and a rebinding to the proper Ipsec rule made to insure proper Ipsec processing. In the preferred embodiment, a binding at the higher layer is done only to the static rule or to a static placeholder for a dynamic rule. This avoids the search of the static rules for packets after a connection has been established. However, the dynamic rules are searched for each packet arriving on a connection. The reason for this is that dynamic rules change much more often than static rules and it may not be efficient in practice to rebind on a connection for every dynamic rule change. In the preferred embodiment, a determination is made if a static rule or placeholder has changed by means of an instance count (IC) variable. When the static rule table is first initialized, the instance count (IC) is set to a non-zero value. Thereafter, every time the static table is changed, the value of IC is incremented. The value of IC is used at the higher layers to detect when static rule or placeholder has changed.

For connectionless protocols, each packet is independent of any prior packet. The attributes SA, DA, SP, DP and P may be completely different for each successive packet. Further, because there is no connection, there is no memory block associated with a connection into which Ipsec information can be saved.

Nevertheless, experience shows that for certain connectionless protocols like UDP, a significant number of consecutive packets tend to be associated with the same IP addresses and ports. Therefore, in accordance with a fourth feature of the invention, for selected connectionless protocols, packets are treated as if they were part of a connection-oriented protocol. A pseudo-connection memory block is allocated with the creation of each socket and Ipsec security binding information is stored in the pseudo-connection memory block on a first packet. Thereafter, as long as the source address and port in incoming packets on the same socket or destination address and port in outgoing packets on the socket remain the same, the packets are treated as part of a simulated connection. The security rules are not searched again until the simulated connection terminates or the static rule table is modified. In the preferred embodiment, only the repeated search of the static rules is omitted. The dynamic rules are searched for each packet.

This application is concerned primarily with the first aspect of the invention. The other aspects of the invention are the subject of separate applications, Ser. Nos. 09/373361, 09/373416 and 09/373360. In the preferred embodiment of this invention, a database of security rules is searched for a match between the values of specified attributes of a packet and the values of corresponding attributes associated with each rule. The database is searched in the order of the rules containing the most specific values of attributes to the least specific values of attributes. The database is arranged into a set of relatively stable static rules and one or more sets of dynamic security rules. A static rule can be a placeholder for a set of dynamic rules. The static rules of the database are searched for the first static rule having attributes that match the corresponding attributes of the packet. Then it is determined if the matching static rule is a placeholder for a set of dynamic rules. If it is, the set of dynamic rules associated with the matching static rule is searched for a match between the packet attributes and attributes contained in the dynamic rules. Finally, security processing is applied to the packet as specified by the matching static or dynamic rule.

BRIEF DESCRIPTION OF THE DRAWINGS

In the Drawings,

FIG. 1 showing sending and receiving nodes attached to a network and an IPSec processing module located within each node;

FIG. 2 shows the prior art structure of a security policy database;

FIG. 3 shows a flowchart of the prior art IPSec processing of an incoming packet in the IP stack layer;

FIG. 4 shows a flowchart of the prior art IPSec processing of an outgoing packet in the IP stack layer;

FIG. 5 shows an illustrative structure of an IPSec static rule database;

FIG. 6 shows an illustrative structure of the dynamic rules of a security policy database according to the invention;

FIG. 7 shows the IPSec processing of an incoming packet in the IP layer of a stack according to the invention;

DETAILED DESCRIPTION OF THE DRAWINGS

Figure 8:
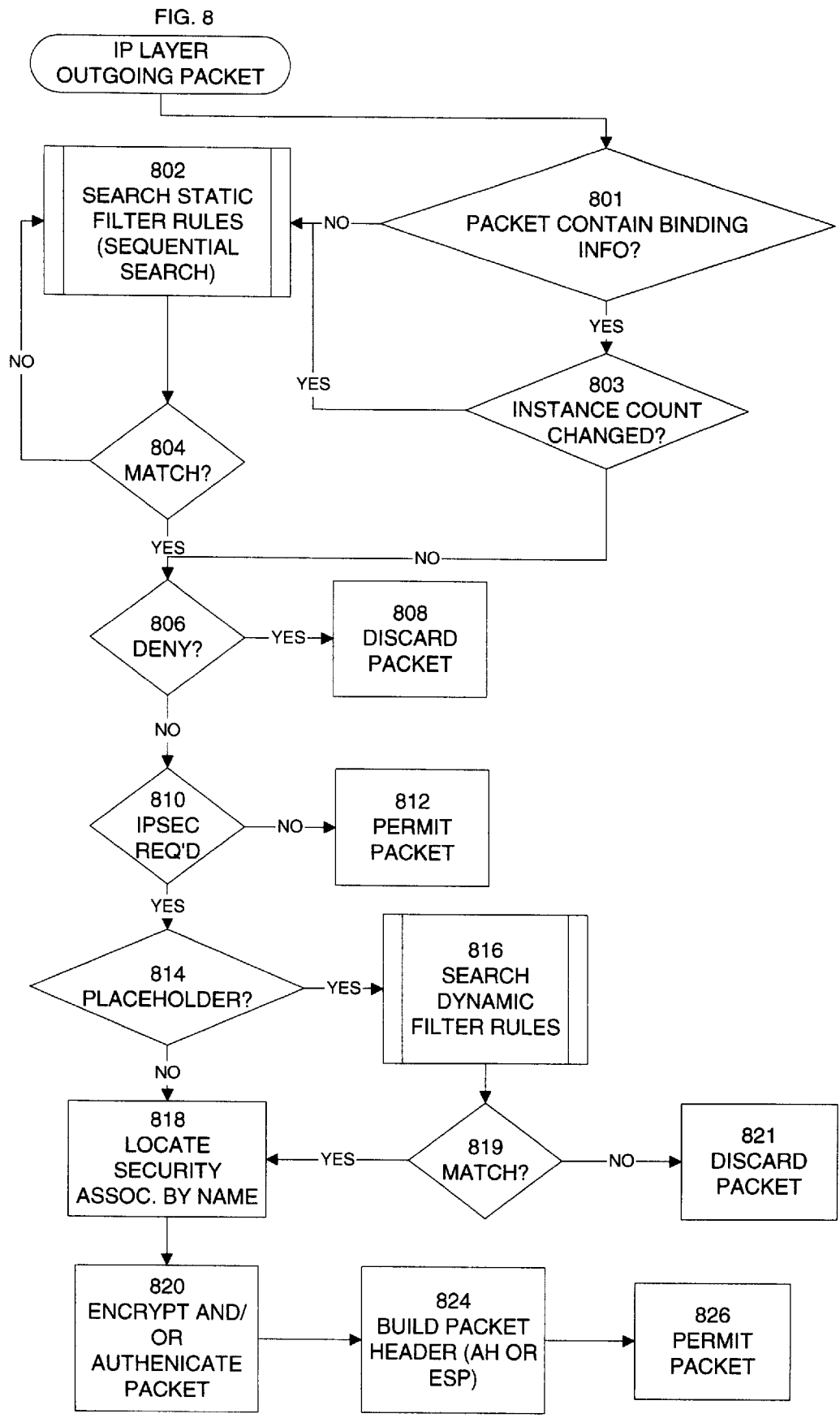
FIG. 8 shows the IPSec processing of an outgoing packet in the IP layer of a stack according to the invention.

FIG. 1 shows an illustrative network in which packet security processing in accordance with RFC 2401 could be practiced. The Fig. shows a network 104 interconnecting two nodes 100 and 102. In this example, node 100 is identified as a sending node (meaning that it is sending a packet) and node 102 is to receive the packet. Node 100 has a software module 101 which determines in this instance according to the security rules if an outgoing packet to node 102 is to be denied, permitted without Ipsec processing or permitted with Ipsec processing. Similarly, node 102 contains a software module 103 that determines for incoming packets if a packet is to be discarded, accepted without Ipsec processing or accepted with Ipsec processing.

Whether a packet is denied, permitted without Ipsec processing or permitted with Ipsec processing is determined by matching the attributes of a packet with the security rules in a security policy database (SPD). As mentioned above, to make this determination the known art searches both static and dynamic rules in the order of most specific to least specific attributes for both outgoing and incoming packets. A static rule is essentially a security policy. Static rules are predefined and generally do not change very often. Dynamic rules are rules that are negotiated between nodes as needed and added to the security policy database.

FIG. 2 shows the database structure of the static and dynamic rules as implemented in one known network. The network begins operation with each node of the network containing an SPD database 200 of predefined static rules and placeholders for future dynamic rules. Each rule and placeholder contains a pointer SP that points to the next rule or placeholder in the database. An ACTION field of each rule specifies that a packet should be denied, permitted with Ipsec processing or permitted without Ipsec processing. A SUBTYPE field of each rule specifies that the rule is a static rule or a placeholder for dynamic rules. Rules, as opposed to placeholders, also contain a security association (SECURITY_ASSOC) field. This field identifies the location of a security association. A security association contains the details of how to process a packet that is subject to Ipsec processing. For example, a Security association might specify that packets be encrypted with 128 bit DES encryption. Each entry of SPD 200 also contains a pointer SP. SP points to the next entry in SPD 200 to be searched in order. If the entry is a static rule or a placeholder for an empty set of dynamic rules, then SP points to the next static rule or placeholder in the database. Dynamic rules are placed immediately before their corresponding placeholder in the database. Therefore, if a rule is actually a placeholder for dynamic rules, but no applicable dynamic rules have been negotiated, then the pointer SP of the static rule or placeholder immediately preceding this placeholder points to this placeholder. This is shown at rule 4 of FIG. 2 (rule 4 is a placeholder for an empty set of dynamic rules). Since no dynamic rules have been negotiated for the attributes contained in placeholder 4, SP of static rule 3 points to placeholder 4. On the other hand, if dynamic rules have been negotiated for a placeholder, these dynamic rules are linked into the database immediately before their placeholder. The pointer SP of the static rule or placeholder immediately preceding the placeholder in question points to the set of dynamic rules. This is shown for placeholder 2 of FIG. 2. Dynamic rules 202 have been negotiated for placeholder 2. Therefore, pointer SP of static rule 1 points to the set of dynamic rules 202. The last dynamic rule of 202 points to the corresponding placeholder, placeholder 2 in this example. The prior art terminates a search for a matching rule if the first match is on a placeholder. In general, it may be assumed that dynamic rules have the same format as static rules.

Static rules, placeholders and dynamic rules have a field (ATTRIBUTES) of attributes which are used to match with the attributes of a packet to determine which rule to apply to the packet. The attributes used for matching typically are IP source address (SA) and source port (SP), IP destination address (DA) and destination port (DP) and protocol (P). If P specifies what protocol is to be used by a packet, it must be verified that a packet in question is using the required protocol in order that a match be declared. Examples of the protocols that might be specified are TCP, UDP, ICMP, OSPF, IPIP, ESP and AH. Not all attributes have to be specified in a rule. For example, a rule might specify that all packets sent between node A and node B, irrespective of port addresses, be encrypted. In this case, the corresponding rule would not specify any values for source and destination ports in the ATTRIBUTES field.

FIG. 3 shows how Ipsec rule searching has been implemented in the known prior art for packets incoming to a node. This rule searching occurs at the Internet Protocol (IP) layer. Step 302 determines if an incoming packet contains an authentication header (AH) or an Encapsulating Security Payload (ESP) header. An AH header specifies that authentication of the origin of this packet be established. An ESP header specifies that the packet is encrypted; an ESP header may also specify authentication, as well as encryption. If either of these headers is present, a Security association must be identified to determine how to authenticate or to decrypt the packet. Step 306 locates the applicable Security association using the SPI (Security Parameter Index) as an index into a hash table of Security associations. Step 308 uses the information contained in the SECURITY_ASSOC to decapsulate (authenticate or decrypt) the packet. The authenticated or decrypted packet may now be used to search the security rules in sequence to find the first matching static or dynamic rule. This is performed at step 304. Step 312 illustrates that the search in step 304 continues until a match occurs (the last rule of a security database typically matches everything). When a rule match occurs, the rule is used to determine at steps 314 and 318 if the packet should be discarded. If the packet is not discarded at step 314, step 316 determines if the matching rule requires that Ipsec processing be applied or not. If Ipsec processing is not required and if an AH or ESP header was not present in the incoming packet, then the packet is permitted at step 324. If step 326 determines that an AH or ESP header was present, this indicates that Ipsec processing is required, but the matching rule says that it is not. This is an inconsistent state and the packet is discarded at step 328.

If step 316 determines that Ipsec processing is required, then step 320 next determines if the matching rule is a placeholder for a set of dynamic rules. If this is true, then a dynamic rule match should have occurred before the placeholder was reached. This is also an inconsistent state and the packet is discarded at step 318. Assuming that the matching rule is not a placeholder, then at step 322 the Security association specified in the packet is compared to the Security association specified in the matching rule. This is an additional security verification to ensure that incoming packets are protected using the correct security policy. If the Security association names match, the packet is permitted at step 324. Otherwise, the packet is discarded at step 328.

FIG. 4 shows a flowchart of the known prior art as implemented for packets outgoing from a node. These steps also occur at the IP layer. Step 402 immediately searches sequentially the static and dynamic rules of FIG. 2 for the first match. When a match is found at step 404, step 406 determines if the matching rule requires that the packet be denied. If so, it is discarded at step 408. Step 410 next determines if Ipsec processing is required for the packet. If not, the packet is permitted at step 412. If Ipsec processing is required, step 414 determines if the matching rule is a placeholder for a set of dynamic rules. If it is, the packet must be denied, because a matching dynamic rule should have been found before reaching the placeholder. Assuming that the matching rule is not a placeholder, step 418 uses the Security association name from the rule to locate the appropriate security association. Step 420 then applies the Security association to encrypt or prepare the packet for later authentication in accordance with the Security association. Step 422 builds the appropriate AH or ESP packet header and step 424 permits this processed packet.

The above describes the prior art, which requires a sequential search through all static and dynamic rules in the order of most specific to least specific specification of attributes until a first matching rule is located.

FIGS. 5 and 6 show illustrative data structures arranged according to the invention to eliminate much of the searching overhead associated with the prior art.

In FIG. 5, a major difference with the prior art structure of FIG. 2 is that the dynamic rules follow, rather than precede, an associated placeholder in the static table. For example, rule 500-2 is a placeholder for a set of dynamic rules 502 that follow the placeholder sequentially in the search order. In other words, dynamic rules follow their corresponding placeholder in the database. This allows the initial search to include only the static rules in structure 500 of FIG. 5 until a matching placeholder is located. Only then are the dynamic rules associated with that static placeholder searched. Thus, most of the searching of dynamic rules is avoided by the invention.

Next, the dynamic rules associated with a placeholder are partitioned into five groups of rules which are arranged in order from the most specific to the least specific specification of attributes. These groups are shown at 502 of FIG. 5 and are:
1) GROUP S (specified attributes=SA, SP, DA, DP, P). Specific values are specified for all of the attributes (SA=source IP address, SP=source port, DA=destination IP address, DP=destination port, P=protocol).
2) GROUP Q (specified attributes=SA, DA SP, P ). The destination port (DP) is a don't care.
3) GROUP R (specified attributes=SA, DA, DP, P). The source port (SP) is a don't care.
4) GROUP P (specified attributes=SA, DA, P). Both the source and destination ports (SP, DP) are don't cares.
5) GROUP O (specified attributes=SA, DA). All attributes except source address (SA) and destination address (DA) are don't cares.

Each of these separate groups of dynamic rules has its own pointer from the static placeholder to the group, as shown at 504 of FIG. 5.

These dynamic rule groups have been chosen such that there is no order dependence of the rules within a group and the order will have no effect on selecting the correct matching rule. This makes it efficient to represent each group with a search tree and this, in turn, further improves the search time associated with the dynamic rules. This is illustrated in FIG. 6. In the preferred embodiment, a patricia tree is used to search each group for a match on attributes, although any search tree algorithm can be used. By way of example, group S of the search trees 600 is shown in FIG. 6 as consisting of three dynamic rules that are matched on KEY1, KEY2 or KEY3. These search keys are the concatenation of the values of the relevant attributes for each rule for the group in question, and they are searched on the concatenation of the corresponding attributes from the packet in question. Algorithms for searching patricia trees are well known and published in standard text books. If a match is obtained while searching a patricia tree, the tree node containing the match contains a pointer to the actual dynamic rule. For example, a match on KEY3 of group S points to the actual rule in the dynamic rule table 602.

The dynamic rule groups S, Q, R, P and O are arranged in that order for searching in the database and this is also the order of most specific to least specific sets of specified attributes. For example, group S rules specify a value for all five attributes SA, SP, DA, DP, P. Groups Q and R are special, in that their order of appearance with respect to each other is irrelevant. This is because they both have the same order of specificity, but on counterpart attributes. Group Q ignores the destination port, while group R ignores the source port. Group P follows next and specifies only the source and destination addresses (SA, DA) and protocol attribute P. The final group O specifies only source and destination addresses.

There is one final group of dynamic rules that contain ranges of source and/or destination IP addresses. This group is illustrated as group 602-5 in FIG. 6. Other attributes may be specified in this ranged group as desired. Because one or both of the address attributes are ranged, this adds an element of order dependence and prevents the group from being efficiently searched other than sequentially. Therefore, after the patricia trees for groups S through O have been unsuccessfully searched, the rules in the ranged group, if any, are searched sequentially.

FIG. 7 shows an illustrative flowchart for processing incoming packets at the IP layer in accordance with the invention. The flowchart differs from that of FIG. 3 only in a few significant places. First, assuming that an AH or ESP header is present in a packet (step 702), step 709 determines after the packet is decapsulated at steps 706 and 708 if the packet is using the connection-oriented protocol TCP or the connectionless UDP protocol. If either of these protocols is used, then in accordance with an aspect of the invention, step 711 attaches the security association name to the packet and passes the packet up to the appropriate TCP or UDP layer for rule searching. Ipsec rule searching for these types of packets is performed at these higher layers, rather that at the IP layer. Since a TCP packet is part of a connection, Ipsec rule searching at the higher TCP layer allows the search to occur only at the beginning of a connection. Since a UDP packet has a connection simulated by the invention insofar as security rule binding information is maintained, this binding information maintained at the UDP layer allows the search of the security database to occur only when the destination address and port changes in a sequence of packets.

Figure 9:
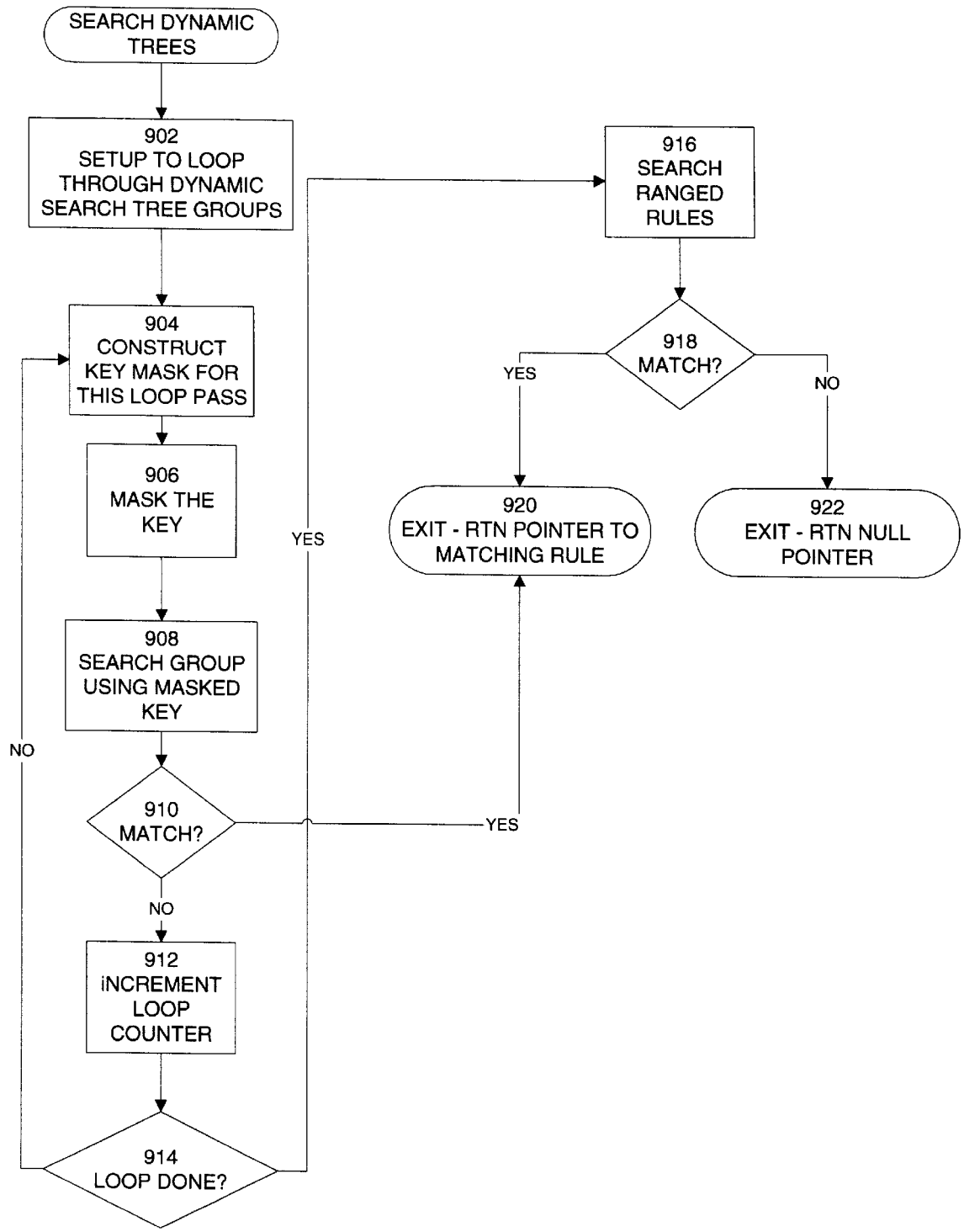
FIG. 9 shows the search algorithm of the dynamic security rule database.

In accordance with a another aspect of the invention, if a packet is not a TCP or UDP packet (step 709), then the rule searching step 704 (counterpart of 304) at the IP layer searches only the static rules until a match is found on a rule or a placeholder. Recall that the prior art of FIG. 3 searches all static and dynamic rules sequentially until a match is found. Therefore, in FIG. 7, after a static rule or placeholder match has been found by 704 and 712 that is not denied and discarded at steps 714 and 718, and it has been determined (step 716) that Ipsec processing is required, then if step 720 determines that the match was on a placeholder, only then are the corresponding dynamic rules searched. The dynamic rules are searched at step 721. The subroutine corresponding to step 721 is shown in FIG. 9 and will be discussed shortly. If the result of the dynamic rule search at 721 is no match (step 725), the packet must be discarded at step 730. This is because it is inconsistent to match on a placeholder and then provide no corresponding dynamic rule that more specifically matches the attributes of the packet. Assuming that a dynamic rule match is found by step 721, the security association specified in the packet is verified at step 722 against the security association required by the matching rule for the same reason as at step 322 of the prior art. Assuming that the security association names match, the packet is permitted at step 724. Otherwise, the packet is discarded. With again reference to step 716, if IPSec is not required, then steps 723 determines if an AH or ESP header is present as earlier discussed with respect to step 326. The the packet is permitted at step 724 if either of these headers is not present. Otherwise, the packet is discarded at step 728.

FIG. 8 shows the processing of an outgoing packet at the IP layer in accordance with another aspect of the invention. Again, the IP layer rule searching differs from the prior art shown in FIG. 4 in a few significant places. For outgoing TCP and UDP packets, the searching of the static rule table is performed at the TCP and UDP layers and the security rule binding information is attached to these packets at the higher layer. Therefore, step 801 at the IP layer determines if the outgoing packet contains security rule binding information. If it does not, the packet is not a TCP or UDP packet and the static table is searched at the IP layer. In this case, step 802 searches the static rules and placeholders until a match is located at step 804. If the matching rule calls for discarding the packet, then it is discarded at steps 806 and 808. If the rule indicates that IPSec processing is not required, then the packet is permitted at steps 810 and 812. After that, if step 814 determines that the match was on a placeholder, then step 816 searches the dynamic rules corresponding to the placeholder. Recall that the prior art of FIG. 4 searched all of the static and dynamic rules sequentially until a match was located. As with FIG. 7, the steps associated with searching the dynamic rules are shown in FIG. 9. If the result of the dynamic rule search is no match, then the packet must be discarded for the same reason as FIG. 7. It is inconsistent to provide a matching placeholder without a matching dynamic rule. Assuming that the dynamic rule search locates a matching dynamic rule, step 818 next locates the security association specified by the dynamic rule. Step 820 applies the security association to encrypt or prepare the packet for later authentication, as called for by the security association. Step 824 builds the appropriate security header and the packet is then permitted at step 826.

At step 801, if the packet does contain security rule binding information from the UDP or TCP layers, the static rules have already been searched at the upper layer and are not searched again at this IP layer, unless the instance count has changed (step 803). If the instance count has changed, the static table has been changed since the binding information was established. Therefore, the static rules must be searched again at step 802 to rebind to a possibly different rule.

Further, unlike the known prior art, the dynamic rules are searched only when the matching static rule is a placeholder (steps 814 and 816). If a dynamic rule match is not found at step 819, the packet is discarded at step 821. Otherwise, step 818 is executed as described above.

FIG. 9 shows an illustrative subroutine that implements the steps such as 721 and 816 for searching the groups of dynamic trees. Recall that there are five groups in the preferred embodiment that use patricia trees as a search tool. Step 902 initializes a search loop for these five groups. Step 904 constructs a search key mask on the relevant attributes according to the specific group associated with this iteration of the loop. Step 906 applies the key mask to the packet attributes to generate the search key. Step 908 searches the patricia tree for the appropriate group in a conventional and known way to locate a match. If a match is found at step 910, the subroutine returns to the calling program at step 721 or 821 with a pointer to the matching dynamic rule. If step 910 does not locate a match in this group, step 912 increments the loop counter to search the next group. This sequence continues through all of the five groups until a match is found or the groups are exhausted. If all five groups have been searched at step 914, step 916 sequentially searches the dynamic rules of a ranged group, if any. If a match is found in the ranged group at step 918, step 920 returns to the calling program with a pointer to the matching rule. Otherwise, step 922 returns with a null pointer, meaning that no match was found in any of the dynamic rule groups.

FIGS. 10 through 13 show the illustrative processing of packets at the TCP and UDP layers. For TCP and UDP incoming packets, both static and dynamic rules are searched as needed at the higher layers. Binding to a security rule is made only to static rules and placeholders in the preferred embodiment. Therefore, in this embodiment, static rules and placeholders are searched only at the beginning of a connection (TCP) or a simulated connection (UDP) or in the event the static table changes during a connection. The dynamic rules are searched for every packet, if the connection is bound to a static placeholder. The same is true for outgoing TCP and UDP packets. However, the dynamic rules are searched at the IP layer rather than at the higher layer. It is understood that the binding ro a security rule can be made to a static or dynamic rule, if desired, and that this operation is within the scope of the invention. In the preferred embodiment, binding is not made to a dynamic rule because it is believed that dynamic rules may change too often to make this option efficient.

In the preferred embodiment, if a dynamic rule changes during the existence of a real or simulated connection and which affects the connection, the change will be picked up on the next packet, because dynamic rules are searched on every packet. However, it is possible that a static rule might change during a connection. Static rules are routinely searched only at the beginning of the connection. To provide for the situation in which a static rule changes during a connection or simulated connection, an instance count (IC) variable is initialized to a positive non-zero value when the static table is first initialized. Thereafter, whenever the static table changes, the value of IC is incremented. As will be seen below, the value of IC is saved when a connection or simulated connection is established and used thereafter to determine if the static table changes, thereby requiring a new search of the static table.

Figure 10:
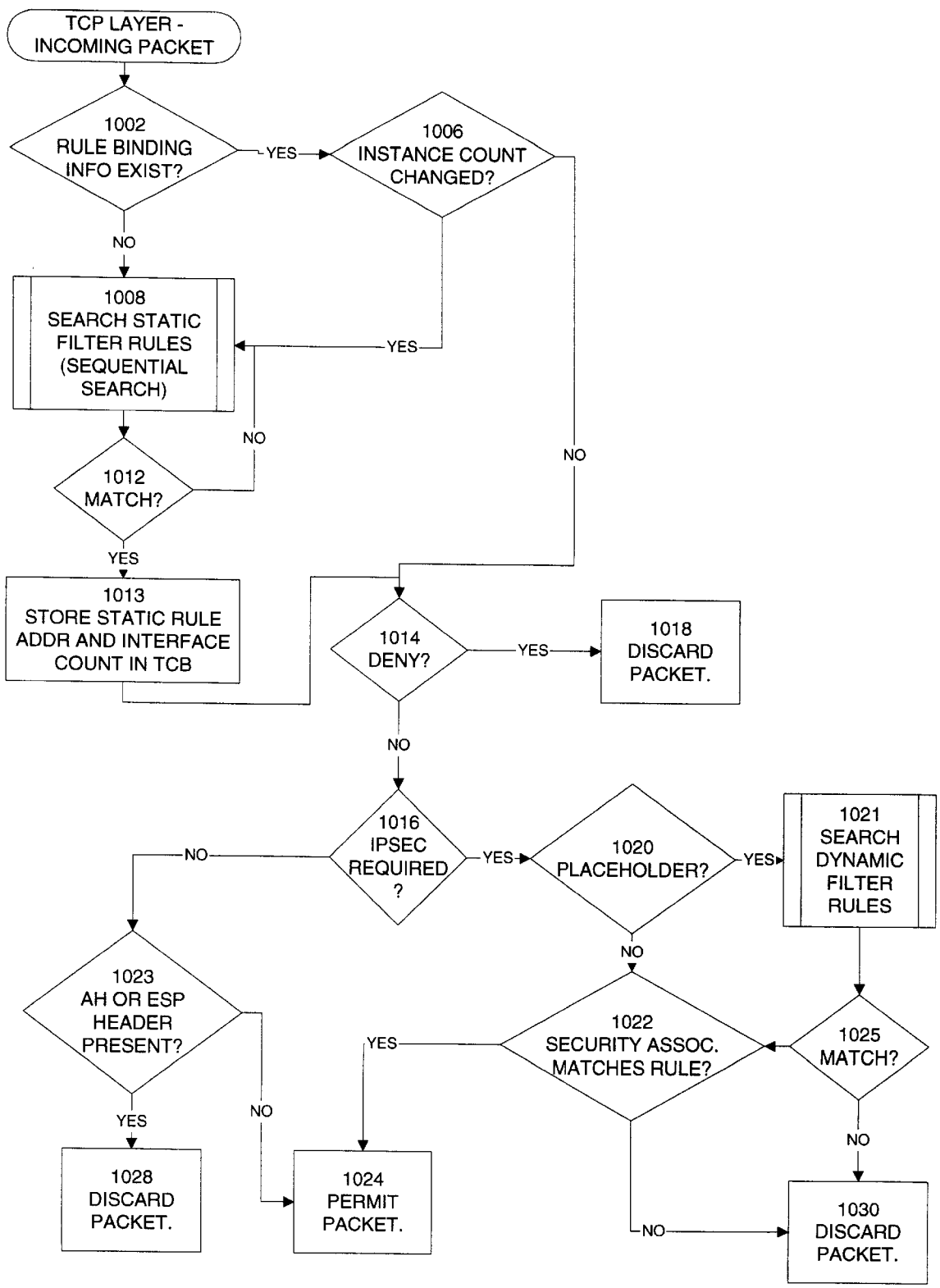
FIG. 10 shows the IPSec processing of an incoming packet in the TCP layer of a stack according to the invention.

FIG. 10 shows the Ipsec rule searching steps that occur at the TCP layer for incoming packets. Step 1002 first determines if a connection is already setup and security rule binding information exists for an incoming packet. This is a matter of determining if the memory block associated with the connection contains a pointer to a security rule. If not, the static rules are searched at step 1008. If a pointer already exists, step 1006 determines if the instance count IC has changed. This is a comparison of the value of the global instance count word IC to the value of IC saved in the connection memory block when the connection is first established. If IC has changed, the static rules are also searched at step 1008. When the static rules are searched and a match found at step 1012, step 1013 stores the address of the static rule or of the controlling placeholder if the match is on a dynamic rule, and the value of the IC variable in the transmission control block (TCB), i.e., the memory block, corresponding to this connection. At this point beginning at step 1014, the TCP layer searching is identical to the IP layer searching beginning at step 714. Therefore, after a static rule or placeholder match has been found and not denied and discarded at steps 1014 and 1018, and it has been determined (step 1016) that Ipsec processing is required, then if step 1020 determines that the match was on a placeholder, only then are the corresponding dynamic rules searched. The dynamic rules are searched at step 1021. If the result of the dynamic rule search at 1021 is no match (step 1025), the packet must be discarded at step 1030. This is because it is inconsistent to match on a placeholder and then provide no corresponding dynamic rule that more specifically matches the attributes of the packet. Assuming that a dynamic rule match is found by step 1021, the security association specified in the packet is verified at step 1022 against the security association required by the matching rule. Assuming that the security association names match, the packet is permitted at step 1024. Otherwise, the packet is discarded. With again reference to step 1016, if IPSec is not required, then steps 1023 determines if an AH or ESP header is present as earlier discussed with respect to step 326. The packet is permitted at step 1024 if either of these headers is not present. Otherwise, the packet is discarded at step 1028. A search of the static rules is avoided for subsequent packets on this connection, unless step 1006 determines that IC changes. In this case, step 1008 repeats the search of the static rules to rebind to a matching static rule or placeholder. Also for each packet on which Ipsec processing is required, if step 1020 determines that the matching static rule found in step 1008 is a placeholder, then the dynamic rules associated with the placeholder are searched at step 1021.

Figure 11:
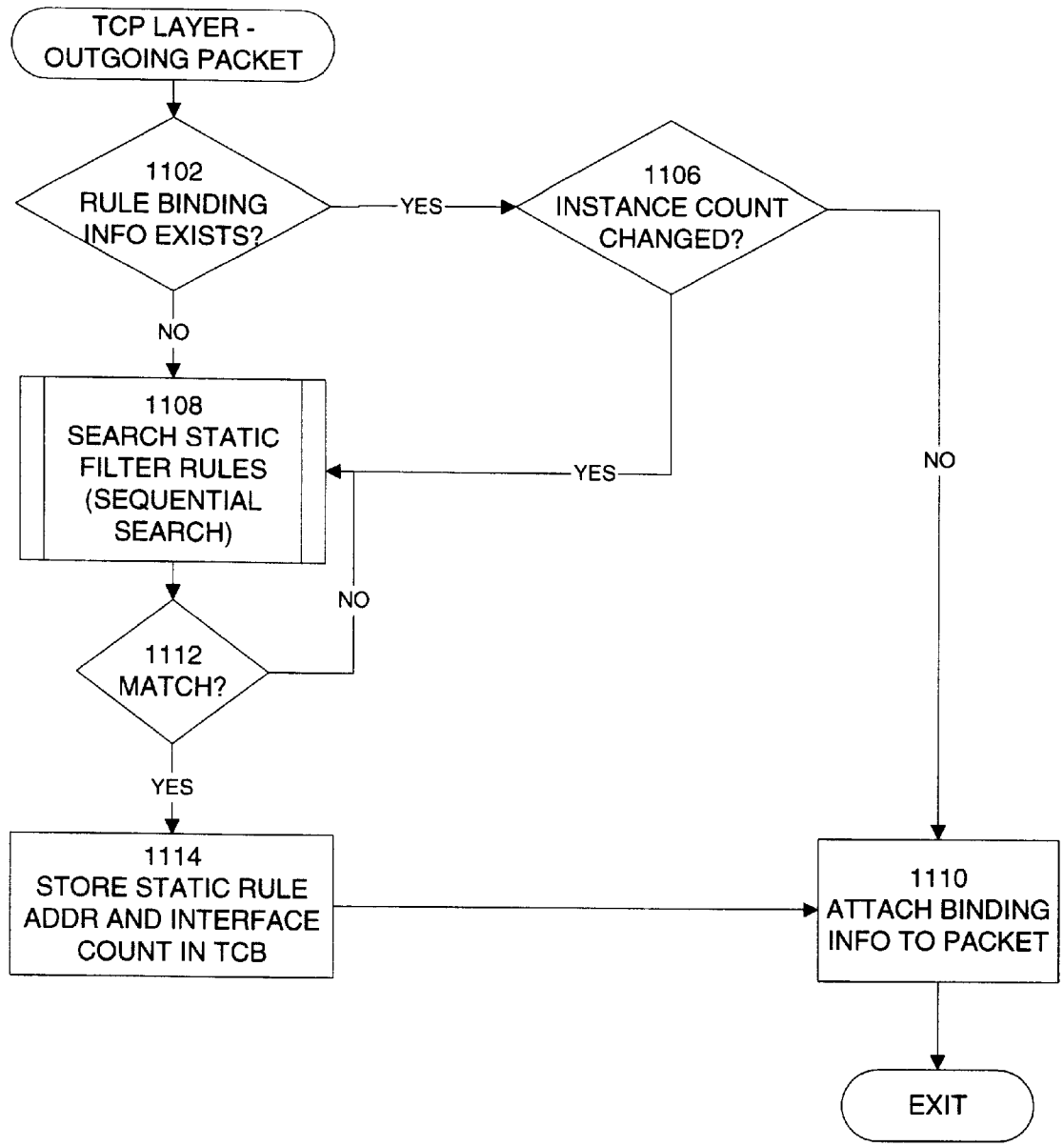
FIG. 11 shows the IPSec processing of an outgoing packet in the TCP layer of a stack according to the invention.

FIG. 11 shows the illustrative steps applied to an outgoing packet at the TCP layer. Step 1102 first determines if a connection is already setup and security rule binding information exists for this outgoing packet. This is a matter of determining if the memory block associated with the connection contains a pointer to a security rule. If not, the static rules are searched at step 1108. If rule binding information is present, step 1106 determines if the instance count IC has changed. This is a comparison of the value of the global instance count word IC to the value of IC saved in the connection memory block when the connection is first established. If IC has changed, the static rules are also searched at step 1108. Again, the searching of the static rules after a connection is established is avoided, unless the instance count changes indicating a modification of one or more of the static rules or placeholders. Whenever the static rules are searched and a match found at step 1112, a binding is entered into the connection memory block to a matching static rule or placeholder at step 1114. This binding information is attached to the outgoing packet at step 1110 and the packet is passed conventionally to the IP layer. The binding information attached to the packet prevents the IP layer from repeating the search of the static database (see step 801 of FIG. 8).

Figure 12:
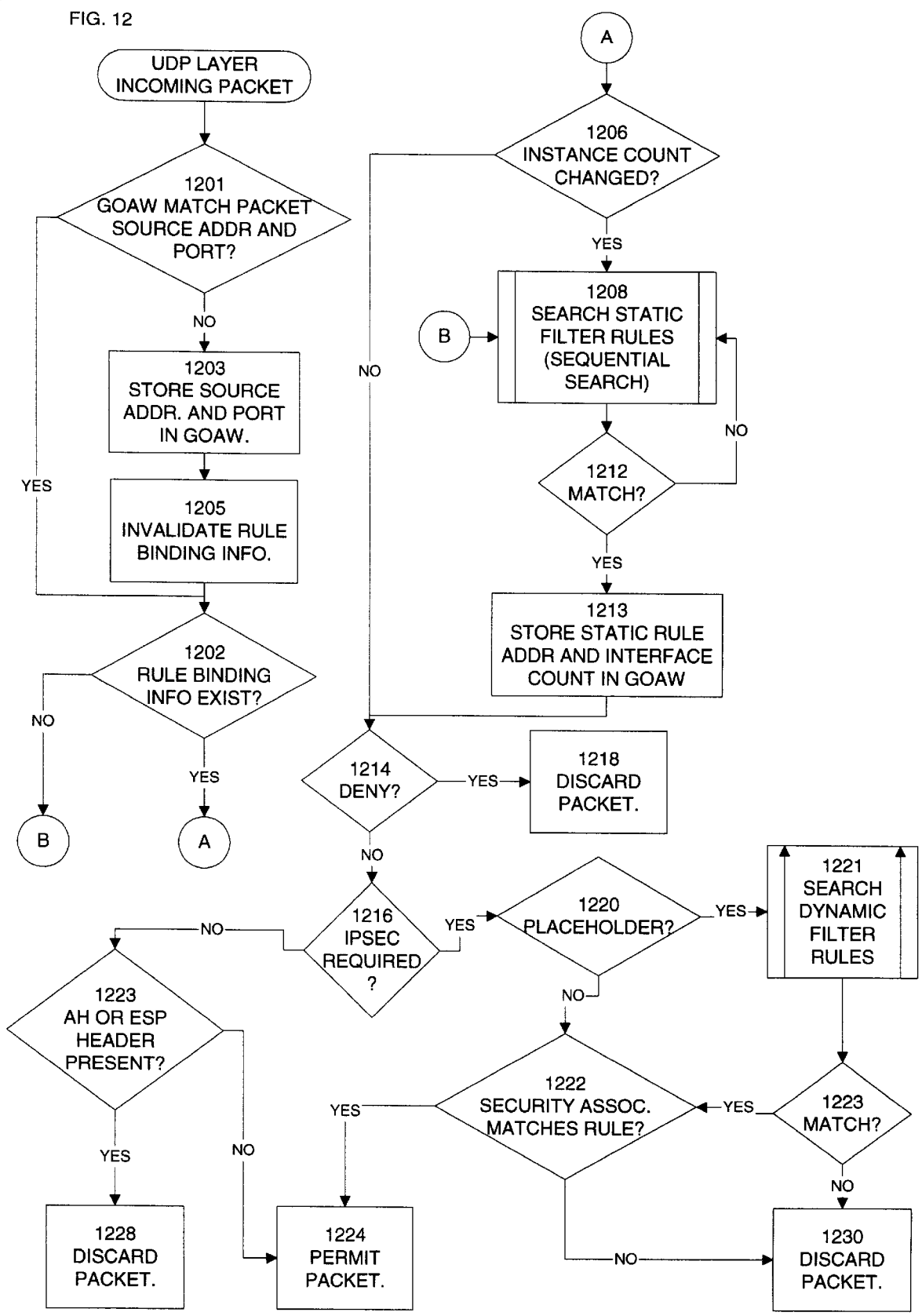
FIG. 12 shows the IPSec processing of an incoming packet in the UDP layer of a stack according to the invention.
Figure 13:
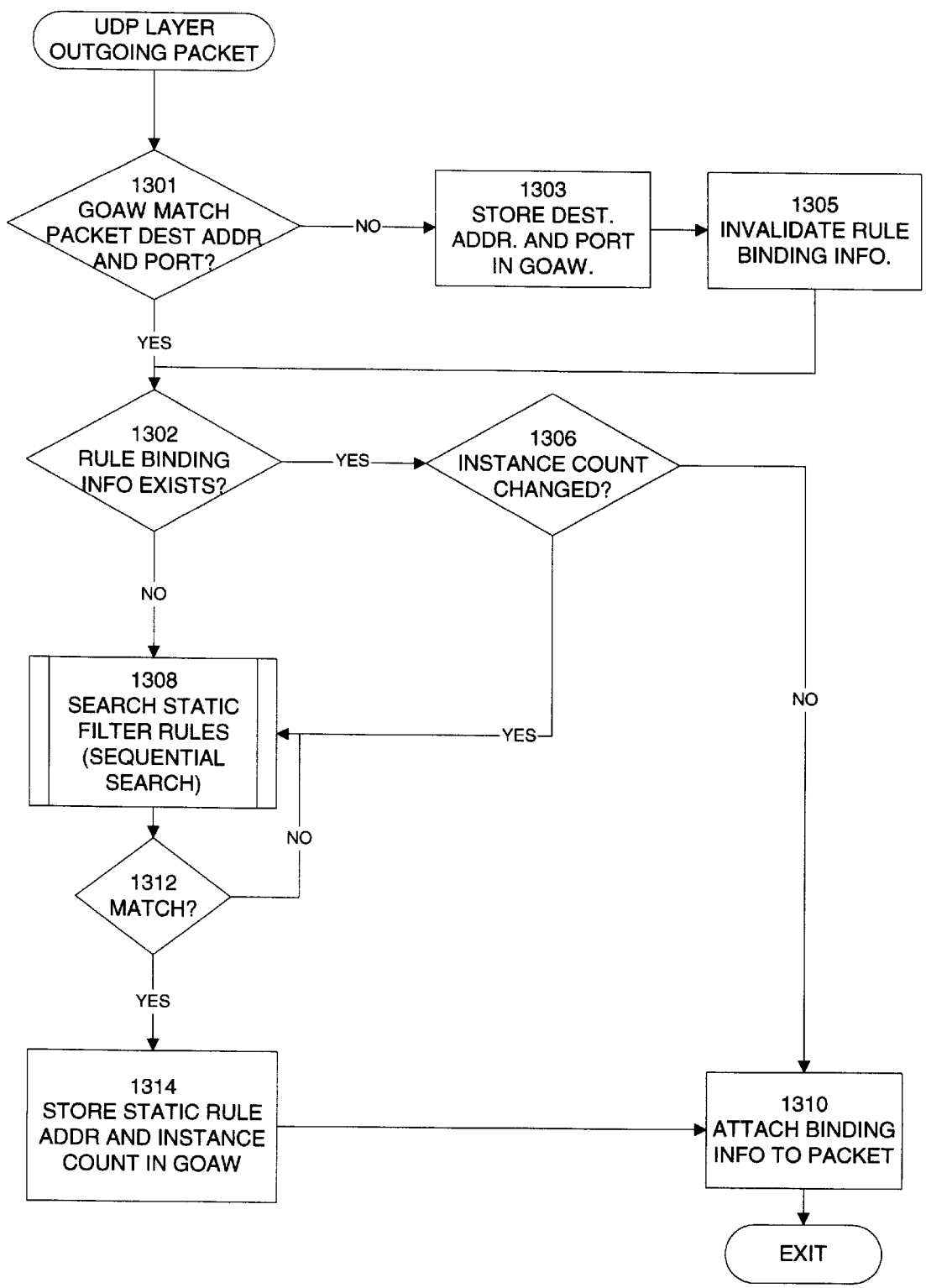
FIG. 13 shows the IPSec processing of an outgoing packet in the UDP layer of a stack according to the invention.

FIGS. 12 and 13 shows illustrative flowcharts of the processing of incoming and outgoing UDP packets, respectively, at the UDP layer. As with TCP packets, the intent is to avoid the searching of the static rules and placeholders. Because UDP is a connectionless protocol, this is accomplished by simulating a connection. When an application at a node sends a UDP packet to another node, the sending application either opens a socket and sends packets over this socket or it uses a socket that is already open. The socket remains open until the sending application closes it. The same is true at the receiving node. A socket is opened on the arrival of a first packet and remains open until the receiving application closes it. In accordance with the invention, when the sending socket is opened, an outgoing memory word referred to as a Global Access Word (GOAW) is allocated to the socket. Likewise, an incoming GOAW word is allocated to the socket at the receiving node. The GOAW words at the respective sending and receiving nodes are used to simulate the connection. As long as a sending node is sending to the same destination address and port over the same socket, the associated packets are treated as belonging to a connection for purposes of searching the security rules. Similarly, as long as packets are received over the same socket from the same source address and port, those packets are also treated as part of a connection.

Initially, an allocated GOAW word contains all zeros, which cannot be a valid source IP address and port. In FIG. 12 when an incoming UDP packet arrives, step 1201 tests the incoming GOAW word allocated to this socket for a match between the source address and port contained in the packet and the corresponding values in the GOAW word. The comparison fails on the first such attempt after the socket is created. Step 1203 therefore stores the source address and port from the packet into the incoming GOAW word. Step 1205 sets a security rule pointer in the GOAW word to zero. As a result of the zero pointer, step 1202 cannot find any packet binding information associated with the packet. Step 1202 therefore branches to step 1208, where a search is made of the static table. When the first match between the packet attributes and a static rule or placeholder in the static table is found at 1212, step 1213 stores the address of the rule and the present value of the instance count IC in the GOAW word. This is the security binding information. The remaining steps of FIG. 12 are identical to those associated with a TCP packet. Therefore, after a static rule or placeholder match has been found and not denied and discarded at steps 1214 and 1218, and it has been determined (step 1216) that Ipsec processing is required, then if step 1220 determines that the match was on a placeholder, only then are the corresponding dynamic rules searched. The dynamic rules are searched at step 1221. If the result of the dynamic rule search at 1221 is no match (step 1223), the packet must be discarded at step 1230. This is because it is inconsistent to match on a placeholder and then provide no corresponding dynamic rule that more specifically matches the attributes of the packet. Assuming that a dynamic rule match is found by step 1221, the security association specified in the packet is verified at step 1222 against the security association required by the matching rule. Assuming that the security association names match, the packet is permitted at step 1224. Otherwise, the packet is discarded at step 1228. With again reference to step 1216, if IPSec is not required, then steps 1223 determines if an AH or ESP header is present as earlier discussed with respect to step 326. The packet is permitted at step 1224 if either of these headers is not present. Otherwise, the packet is discarded at step 1228.

When the next packet arrives on this socket, step 1201 compares the source address and port in the packet to that stored in the incoming GOAW word. If they match, this packet is considered part of the simulated connection. Step 1201 branches to step 1202, where a check is made for binding information in the GOAW word. In this instance, the binding information is there from the preceding packet, which causes a branch from 1202 to entry point A and step 1206. Next, step 1206 compares the value of IC in the GOAW word to the value of the variable IC to see if the static table has been modified. If these values are the same, the static table has not been modified. Therefore, the search of the static table is omitted by branching directly to step 1214. If IC and the saved value of IC are different, the static table has been modified and the static table must be searched again at step 1208 in case the security rule associated with this simulated connection has changed.

When the step at 1201 detects a change in the source address or port contained in the incoming packet, the simulated connection is considered terminated. Step 1201 branches to step 1203 where the new source address and port are stored in GOAW. Step 1205 invalidates the security binding information stored in GOAW and step 1202 causes a new search of the static rules at step 1208.

FIG. 13 shows an illustrative flowchart of the processing of outgoing UDP packets at the UDP layer. The intent is the same as for incoming UDP packets. That is, to treat consecutive packets going to the same destination address and port as part of a simulated connection and to avoid repeating a search of the static rules. As with incoming packets, when a socket is first opened for an outgoing packet, an outgoing GOAW work is allocated and its contents set to all zeros. Step 1301 compares the destination address and port in the packet to the values in the outgoing GOAW word. The comparison fails, and step 1303 saves the destination address and port in the packet in the outgoing GOAW word. Step 1305 invalidates any security binding information by setting the security rule pointer in GOAW to zero. Therefore, step 1302 cannot locate any binding information and branches to step 1308 to perform a search of the static table. Once a match is found at step 1312, step 1314 stores the address of the matching rule and the value of IC in GOAW. Step 1310 attaches this binding information to the packet and exits. The packet is passed to the IP layer in conventional manner. When it is received at the IP layer, step 801 determines that the packet contains binding information. Step 803 compares the value of IC to the value of IC stored in the binding information and attached to the packet to determine if the static table has changed. Assuming that it has not, step 803 skips the search of the static table at step 802 and proceeds directly to step 806. If the static table is determined at step 803 to have been changed, step 803 branches to step 802 to repeat the search of the static table in case the appropriate security for this simulated connection has changed. In either event, a set of dynamic rules are searched at step 816 if the matching static rule is a placeholder.

If rule binding information is present at step 1302, step 1306 determines if the instance count IC has changed. This is a comparison of the value of the global instance count word IC to the value of IC saved in the connection memory block when the connection is first established. If IC has changed, the static rules are also searched at step 1308.

When step 1301 detects that the destination address or the port in an outgoing UDP packet no longer matches that stored in GOAW, the simulated outgoing connection is considered terminated. In this event, step 1303 stores the new destination address and port in GOAW. Step 1305 zeros the rule pointer in GOAW to invalidate the binding information. As a result, step 1302 does not detect any binding information and it branches to step 1308 to perform a new search of the static rules.

It is to be understood that the above described arrangements are merely illustrative of the application of principles of the invention and that other arrangements may be devised by workers skilled in the art without departing from the spirit and scope of the invention.

What is claimed is:

1. A method of searching a database of security rules for a match between the values of specified attributes of a packet and the values of corresponding attributes associated with each rule, wherein the database is searched in the order of the rules containing the most specific values of attributes to the least specific values of attributes, comprising arranging the database into a set of relatively stable static rules and one or more sets of dynamic security rules, wherein a static rule can be a placeholder for a set of dynamic rules, searching the static rules of the database for the first static rule having attributes that match the corresponding attributes of the packet, determining if the matching static rule is a placeholder for a set of dynamic rules, if the matching static rule is a placeholder for a set of dynamic rules, searching the set of dynamic rules associated with the matching static rule for a match between the packet attributes and attributes contained in the dynamic rules, and applying security processing to the packet as specified by the matching static or dynamic rule.

2. The method of claim 1 further comprising partitioning a set of dynamic rules into groups according to attributes such that within each group there is no order dependency of the rules, and searching the dynamic rules within a group using a non-sequential search mechanism.

3. The method of claim 2 wherein the groups are defined on attributes of the internet protocol (IP) and ordered as follows:

a first group specifying attributes of source IP address, destination IP address, source port, destination port, and protocol;

a second group specifying attributes of source IP address, destination IP address, either a source port or an address port, and protocol;

a third group specifying attributes of source IP address, destination IP address, the other of the source port or the destination port that is not specified by the second group, and protocol;

a fourth group specifying source IP address, destination IP address, and protocol; and a fifth group specifying source IP address and destination IP address.

4. The method of claim 3 further comprising defining a sixth group of dynamic rules that contain a range of IP addresses specified in either or both of the source and destination addresses, and sequentially the rules of the sixth group if no match is found between the attributes specified in the dynamic rules of the first through the fifth groups and the corresponding attributes of the packet.

5. Apparatus for searching a database of security rules for a match between the values of specified attributes of a packet and the values of corresponding attributes associated with each rule, wherein the database is searched in the order of the rules containing the most specific values of attributes to the least specific values of attributes, comprising a set of relatively stable static rules in the database and one or more sets of dynamic security rules in the database, wherein a static rule can be a placeholder for a set of dynamic rules, structure for searching the static rules of the database for the first static rule having attributes that match the corresponding attributes of the packet, structure for determining if the matching static rule is a placeholder for a set of dynamic rules, structure responsive to the determining structure for searching a set of dynamic rules associated with a matching placeholder for a match between the packet attributes and attributes contained in the dynamic rules, and security processing structure for processing the packet as specified by the matching static or dynamic rule.

6. The apparatus of claim 5 further comprising structure for partitioning a set of dynamic rules into groups according to attributes such that within each group there is no order dependency of the rules, and structure for searching the dynamic rules within a group using a non-sequential search mechanism.

7. The apparatus of claim 6 wherein the groups are defined on the attributes of the internet protocol (IP) and ordered as follows:

a first group specifying attributes of source IP address, destination IP address, source port, destination port, and protocol;

a second group specifying attributes of source IP address, destination IP address, either a source port or an address port, and protocol;

a third group specifying attributes of source IP address, destination IP address, the other of the source port or the destination port that is not specified by the second group, and protocol;

a fourth group specifying source IP address, destination IP address, and protocol; and a fifth group specifying source IP address and destination IP address.

8. The apparatus of claim 7 further comprising a sixth group of dynamic rules containing a range of IP addresses specified in either or both of the source and destination addresses, and structure activated after the first through the fifth groups of dynamic rules of a set have been unsuccessfully searched for sequentially searching the rules of the sixth group.

9. A storage medium containing stored executable computer instructions for controlling a computer to search a database of security rules for a match between the values of specified attributes of a packet and the values of corresponding attributes associated with each rule, wherein the database is searched in the order of the rules containing the most specific values of attributes to the least specific values of attributes, comprising a first code segment for arranging the database into a set of relatively stable static rules and one or more sets of dynamic security rules, wherein a static rule can be a placeholder for a set of dynamic rules, a second code segment for searching the static rules of the database for the first static rule having attributes that match the corresponding attributes of the packet, a third code segment for determining if the matching static rule is a placeholder for a set of dynamic rules, a fourth code segment responsive to the third segment for searching the set of dynamic rules associated with the matching placeholder for a match between the packet attributes and attributes contained in the dynamic rules, and a fifth code segment for applying security processing to the packet as specified by the matching static or dynamic rule.

10. The storage medium of claim 9 further comprising a sixth code segment for partitioning a set of dynamic rules into groups according to attributes such that within each group there is no order dependency of the rules, and an seventh code segment for searching the dynamic rules within a group using a non-sequential search mechanism.

11. The storage medium of claim 10 wherein the first code segment defines the groups on the internet protocol (IP) and orders then as follows:

a first group specifying attributes of source IP address, destination IP address, source port, destination port, and protocol;

a second group specifying attributes of source IP address, destination IP address, either a source port or an address port, and protocol;

a third group specifying attributes of source IP address, destination IP address, the other of the source port or the destination port that is not specified by the second group, and protocol;

a fourth group specifying source IP address, destination IP address, and protocol; and a fifth group specifying source IP address and destination IP address.

12. The storage medium of claim 11 further comprising an eighth code segment for defining a sixth group of dynamic rules that contain a range of IP addresses specified in either or both of the source and destination addresses, and a ninth code segment for sequentially searching the rules of the sixth group if no match is found between the attributes specified in the dynamic rules of the first through the fifth groups and the corresponding attributes of the packet.

13. A carrier wave embodying a computer data signal and containing stored executable computer instructions for controlling a computer to search a database of security rules for a match between the values of specified attributes of a packet and the values of corresponding attributes associated with each rule, wherein the database is searched in the order of the rules containing the most specific values of attributes to the least specific values of attributes, comprising a first code segment for arranging the database into a set of relatively stable static rules and one or more sets of dynamic security rules, wherein a static rule can be a placeholder for a set of dynamic rules, a second code segment for searching the static rules of the database for the first static rule having attributes that match the corresponding attributes of the packet, a third code segment for determining if the matching static rule is a placeholder for a set of dynamic rules, a fourth code segment responsive to the third code segment for searching the set of dynamic rules associated with the matching placeholder for a match between the packet attributes and attributes contained in the dynamic rules, and a fifth code segment for applying security processing to the packet as specified by the matching static or dynamic rule.

14. The carrier wave of claim 13 further comprising a sixth code segment for partitioning a set of dynamic rules into groups according to attributes such that within each group there is no order dependency of the rules, and an seventh code segment for searching the dynamic rules within a group using a non-sequential search mechanism.

15. The carrier wave of claim 14 wherein the first code segment defines the groups on the internet protocol (IP) and orders then as follows:

a first group specifying attributes of source IP address, destination IP address, source port, destination port, and protocol;

a second group specifying attributes of source IP address, destination IP address, either a source port or an address port, and protocol;

a third group specifying attributes of source IP address, destination IP address, the other of the source port or the destination port that is not specified by the second group, and protocol;

a fourth group specifying source IP address, destination IP address, and protocol; and a fifth group specifying source IP address and destination IP address.

16. The data signal of claim 15 further comprising a eighth code segment for defining a sixth group of dynamic rules that contain a range of IP addresses specified in either or both of the source and destination addresses, and a ninth code segment for sequentially searching the rules of the sixth group if no match is found between the attributes specified in the dynamic rules of the first through the fifth groups and the corresponding attributes of the packet.

* * * * *